United States Patent [19]

Kurihara et al.

[11] Patent Number: 5,043,972
[45] Date of Patent: Aug. 27, 1991

[54] OPTICAL COMPONENT-DRIVING DEVICE FOR OPTICAL PICKUP

[75] Inventors: Toshihiko Kurihara; Jun Suzuki, both of Saitama, Japan

[73] Assignee: Pioneer Electronic Corporation, Tokyo, Japan

[21] Appl. No.: 374,803

[22] Filed: Jul. 3, 1989

[30] Foreign Application Priority Data

Aug. 15, 1988 [JP] Japan .................. 63-107478[U]

[51] Int. Cl.⁵ ............................................. G02B 7/02
[52] U.S. Cl. .................. 369/215; 369/44.22; 369/13; 360/104; 359/824
[58] Field of Search .............. 369/215, 44.22, 13, 369/231, 219, 244; 360/104, 105, 106; 350/247, 255

[56] References Cited

U.S. PATENT DOCUMENTS

| | | | |
|---|---|---|---|
| 4,643,522 | 2/1987 | Takashima | 350/255 |
| 4,750,164 | 6/1988 | Nose | 350/255 |
| 4,752,117 | 6/1988 | Ichikawa et al. | 350/255 |
| 4,842,392 | 6/1989 | Nakamura et al. | 369/44.22 |
| 4,861,138 | 8/1989 | Suzuki | 369/44.22 |
| 4,942,562 | 7/1990 | Suzuki | 369/219 |

*Primary Examiner*—William M. Shoop, Jr.
*Assistant Examiner*—John W. Cabeca
*Attorney, Agent, or Firm*—Sughrue, Mion, Zinn Macpeak & Seas

[57] ABSTRACT

An optical component-driving device for driving an optical component along a tracking axis and/or a focusing axis includes a magnet, a yoke and a coil. The coil is fixed to a moveable member which houses the optical component to be moved. The coil is disposed in spaced, opposed relation to two opposite polarity surfaces arranged adjacent and planar to one another and disposed in the direction of tracking and/or focusing. The first polarity surface is provided by the facing surface of a polarized magnet. The second polarity surface is provided by one end face of a yoke; the other end face of which abuts the opposite polarity backing surface of the magnet.

10 Claims, 3 Drawing Sheets

OPTICAL COMPONENT-DRIVING DEVICE FOR OPTICAL PICKUP

FIELD OF THE INVENTION

This invention relates to an optical component-driving device for an optical pickup.

BACKGROUND OF THE INVENTION

An optical pickup applies focused laser light onto a recording track, formed on an information recording surface of an optical recording medium, to form a spot of light on the recording track, so that the optical pickup can detect a change in the light reflected from the information recording surface to thereby read the information recorded on the surface. Therefore, it is necessary that the information reading laser light is always focused on the recording track even when the recording surface of the recording medium is displaced out of position due to a warp of the recording medium, etc. To achieve this, the optical pickup apparatus includes a focus servo for focusing the laser light by moving precisely an objective lens in a direction perpendicular to the information recording surface. Also, since it is necessary to have the laser beam accurately track the recording track even when the recording track is eccentric, the optical pickup apparatus also includes a tracking servo for precisely moving the laser spot in a direction perpendicular to the recording track, i.e., the radial direction.

FIG. 5 shows a conventional drive device for driving an objective lens to perform the focusing servo and tracking servo operations. This conventional drive device is disclosed in U.S. Pat. No. 4,861,138, issued to Suzuki on Aug. 29, 1989.

As shown in FIG. 5, a tracking coil 3 is fixedly secured to one end of a holder member 2 for holding an objective lens 1. The holder member 2 is supported by a support mechanism (not shown) in such a manner that the holder member 2 is movable in a direction (indicated by an arrow T) perpendicular to the direction (indicated by an arrow F) of the optical axis of the objective lens 1; that is, movable in a direction perpendicular to a recording track of a recording medium (not shown).

A magnet 4 in the form of a rectangular plate is disposed in opposed relation to the tracking coil 3 and is spaced a predetermined distance from the tracking coil 3. The magnet 4 is affixed to a fixed support member 5. The magnet 4 is so magnetized that it has two pole surfaces 5a and 5b of opposite polarity (north and south poles) juxtaposed in the direction of the arrow T. The tracking coil overlaps both of these two poles astride the boundary therebetween.

A magnetic flux designated by reference numeral 6 is produced in the drive device of the above construction, and when electric current is supplied to the tracking coil 3, an electromagnetic force is exerted in the direction of the arrow T on those two portions of the tracking coil 3 facing the north pole and south pole surfaces, respectively. The objective lens 1 is driven, together with the holder member 2, by this electromagnetic force to thereby effect the tracking servo.

In the above drive device in which a magnetic flux is produced between the two pole surfaces of opposite polarity disposed adjacent each other in a plane, the magnetic circuit is very thin, and therefore the overall construction of the device can be compact. However, the drive device requires a large and relatively expensive magnet, and therefore the overall cost is high. The magnet of such a construction is produced by magnetizing a flat plate of magnetic material using a magnetizer having two magnetizing yokes of opposite polarity disposed in juxtaposed relation to each other. With this method, however, the two pole surfaces can not be perfectly magnetized in the vicinity of the boundary therebetween, and to compensate for this, the magnet must be increased in size. This increases the size of the tracking coil, and offers a problem to be solved in achieving a compact overall construction of the device.

SUMMARY OF THE INVENTION

It is an object of this invention to improve the prior art drive device of the type described above and to provide a drive device which is compact in size and can be manufactured at lower cost.

According to the present invention, there is provided an optical component-driving device for an optical pickup, comprising a magnetic circuit providing first and second pole surfaces of opposite polarity disposed adjacent to each other; and a coil disposed in spaced, opposed relation to said first and second pole surfaces; said magnetic circuit comprising a magnet one pole of which defines said first pole surface, and a yoke having one end portion held against the other pole of said magnet, the other end portion of said yoke defining said second pole surface.

DESCRIPTION OF THE PREFERRED EMBODIMENT

Preferred embodiments of an optical component-driving device of the present invention will now be described with reference to the accompanying drawings.

Figure 1:
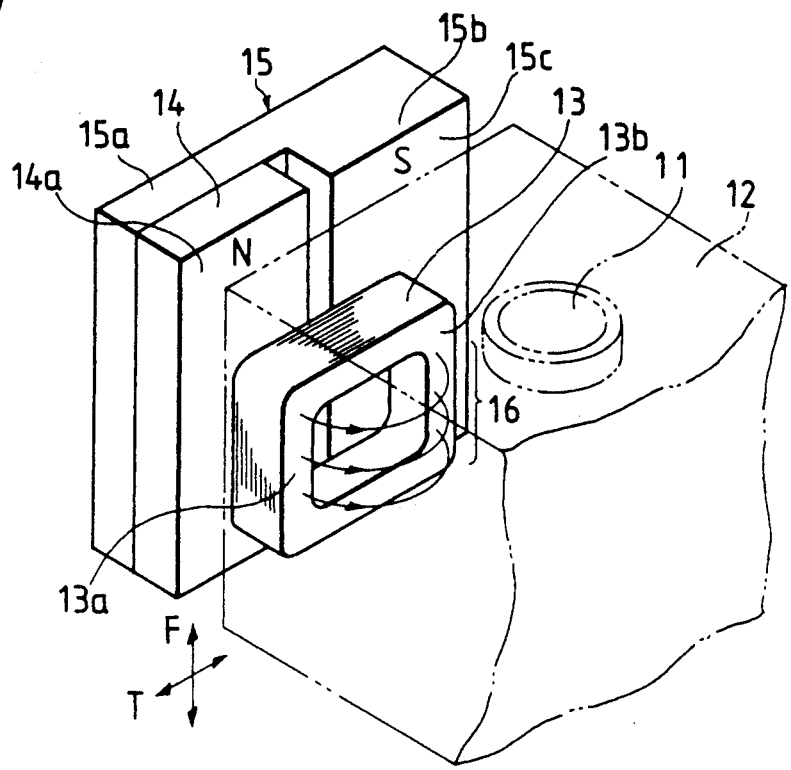
FIG. 1 is a perspective view of an optical pickup incorporating a first preferred embodiment of an optical component-driving device of the present invention.

FIG. 1 shows an optical pickup incorporating a first preferred embodiment of an optical component-driving device of the present invention.

As shown in FIG. 1, an objective lens 11 is supported on a central portion of a holder member 12 of a rectangular parallelepipedic shape, and a tracking coil 13 is mounted on one end of the holder member. The objective lens 11 serves to focus laser light, emitted from a light-emitting element such as a laser diode, onto a recording track of a recording medium (not shown) to form a spot of light on the recording track. The holder member 12 is supported by a support mechanism (not shown) in such a manner that the holder member is movable in a direction (indicated by an arrow T) perpendicular to the direction (indicated by an arrow F) of the optical axis of the objective lens 11, that is, movable in a direction perpendicular to the recording track of the recording medium.

A magnet 14 in the form of a rectangular plate is disposed in opposed relation to the tracking coil 13 and is spaced a predetermined distance from the tracking coil 13. The front and rear faces of the magnet 14 are magnetized to have north pole and south pole, respectively. A yoke 15 is held against the rear face of the magnet 14 and cooperates with the magnet 14 to constitute a magnetic circuit. The magnet 14 and the yoke 15 are bonded to a support member (not shown) which constitutes fixed portions with respect to which the movable portions, that is, the holder member 12 and the tracking coil 13 are movable.

The yoke 15 has an L-shaped cross-section as viewed in the direction of the optical axis of the objective lens 11 (i.e, the direction of the arrow F). The south pole face of the magnet 14 is held against one end portion 15a of the yoke 15. A surface 15c of the other end portion 15b of the yoke 15 is planar or flat, is disposed adjacent to the front face 14a of the magnet 14, and constitutes a south pole of the combined magnet-yoke circuit. The surface 15c of the yoke 15 and the front face 14a of the magnet 14 lie in a common plane. The front face 14a of the magnet 14 serves as a north pole surface whereas the surface 15c of the other end portion 15b of the yoke 15 serves as a south pole surface. The tracking coil 13 overlaps the first and second pole surfaces.

In the optical component-driving device of this construction, a magnetic flux, designated by reference numeral 16, is produced between the first and second pole surfaces. When electric current is supplied to the tracking coil 13, an electromagnetic force is exerted on those two portions 13a and 13b of the tracking coil 13 facing the north and south pole surfaces, respectively. Therefore, the objective lens 11 is driven together with the holder member 12 supporting the objective lens 11, thereby effecting a tracking servo.

Although the optical component to be driven is shown as the objective lens 11 in the optical component-driving device of the first embodiment, the optical component may be, for example, a light-emitting element, a light-receiving element, a diffraction grating, a cylindrical lens or a beam splitter. One or more or all of these components can be mounted on the holder member 12 so that they can be driven to perform a tracking servo and a focusing servo. This can also be applied to the other embodiments of optical-component driving devices described below.

Since the first and second pole surfaces lie in a common plane, the magnetic flux can be produced efficiently, thereby achieving a large driving force.

Figure 2:
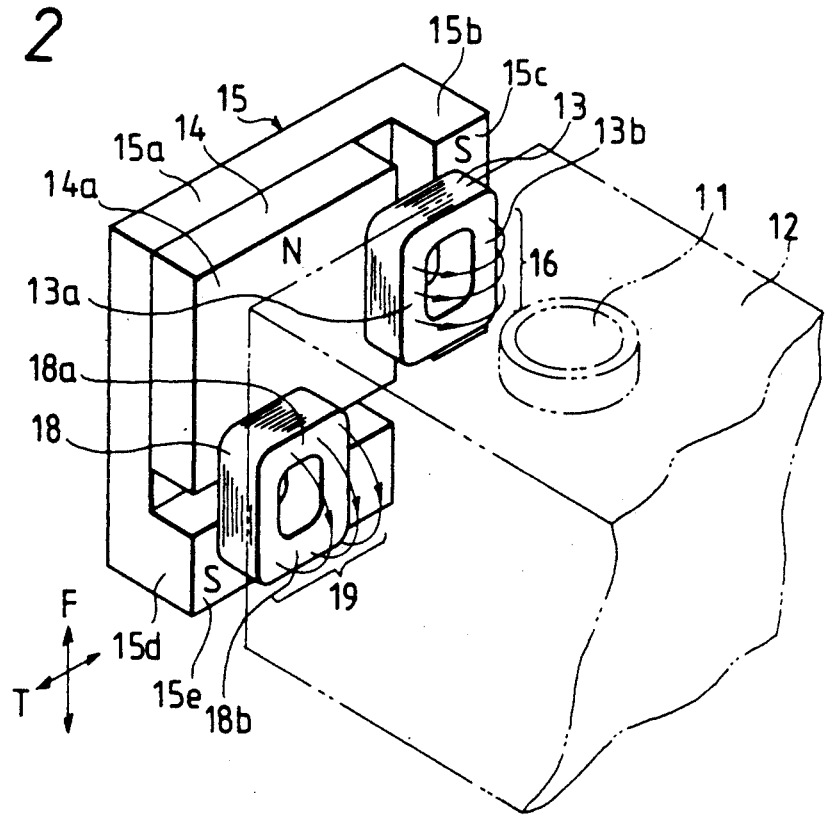
FIG. 2 is a perspective view of an optical pickup incorporating a second preferred embodiment of an optical component-driving device of the present invention.

FIG. 2 shows an optical pickup incorporating a second preferred embodiment of an optical component-driving device of the present invention. The optical component-driving device of this embodiment is identical in construction to the optical component-driving device of the first embodiment except for those parts described below, and therefore the common parts will not be described in detail. The same or corresponding parts are designated respectively by the same reference numerals used in the first embodiment. This is also applied to the other embodiments of the invention described below.

As shown in FIG. 2, in addition to a tracking coil 13, a focusing coil 18 is secured to one end of a holder member 12 supporting an objective lens 11. The yoke 15 has another end portion 15d facing the focusing coil 18, and a surface 15e of the end portion 15d is planar or flat. A front face 14a of a magnet 14 serves as a north pole surface whereas the surface 15e of the end portion 15d of the yoke 15 serves as a south pole surface. The focusing coil 18 overlaps the north and south pole surfaces.

In the optical component-driving device of this embodiment, a magnetic flux designated by reference numeral 19 is produced between the north and south pole surfaces. An electromagnetic force is exerted in the direction of an arrow F on those two portions 18a and 18b of the focusing coil 18 facing the north and south pole surfaces, respectively. Therefore, the objective lens 11 is driven in the direction of an arrow T by an electromagnetic force exerted on a tracking coil 13 and also is driven in the direction of the arrow F, thereby effecting a tracking servo and a focusing servo.

In order to produce the electromagnetic force efficiently, it is preferred that the spacing between the coil 13 and coil 18, on the one hand, and the magnet 14 and yoke 15, on the other hand, be as small as possible.

Figure 3:
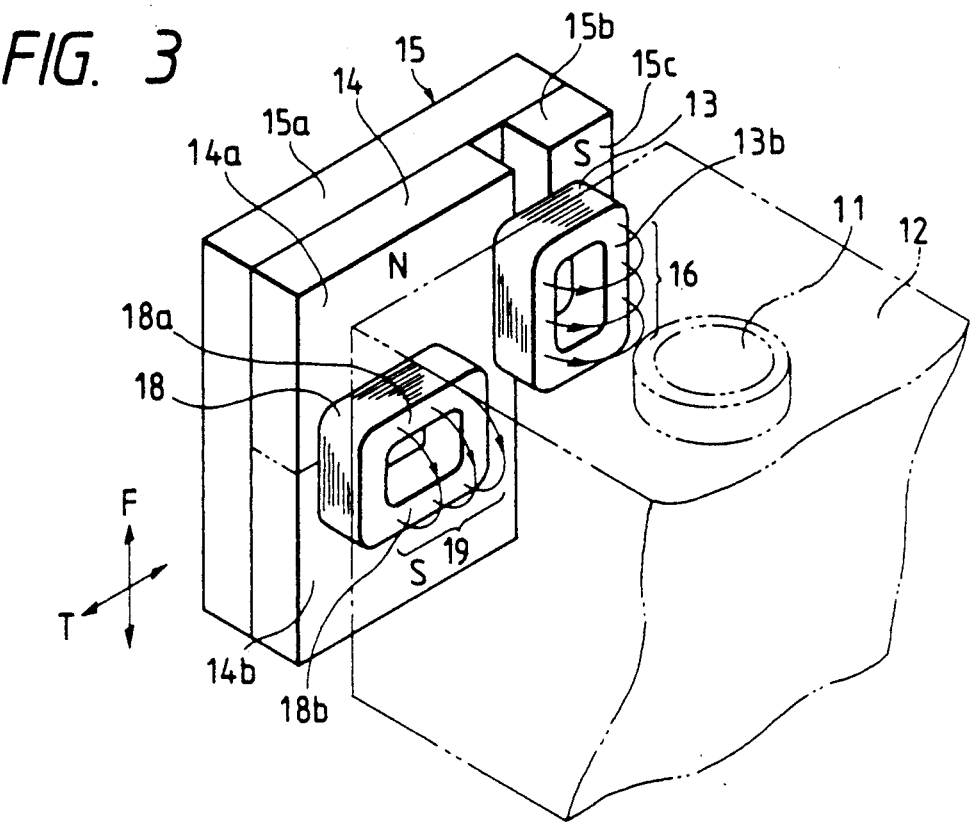
FIG. 3 is a perspective view of an optical pickup incorporating a third preferred embodiment of an optical component-driving device of the present invention.
Figure 5:
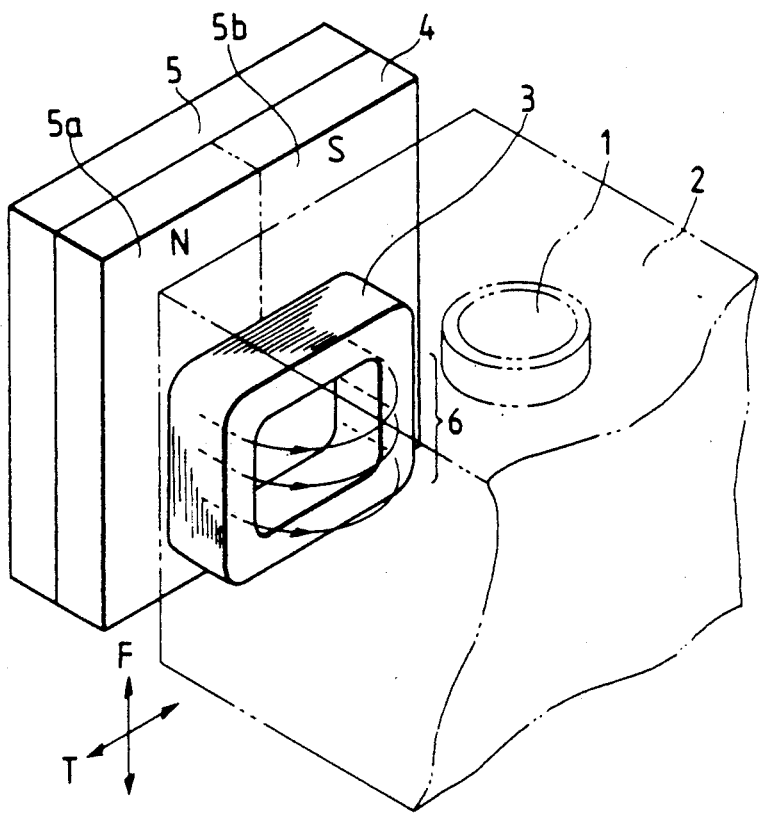
FIG. 5 is a perspective view of a conventional optical component-driving device.

FIG. 3 shows an optical pickup incorporating a third preferred embodiment of an optical component-driving device of the present invention.

As shown in FIG. 3, a magnet 14 is magnetized to have two pole surfaces 14a and 14b of opposite polarity (north pole and south pole) arranged in a direction of an arrow F. A focusing coil 18 is disposed in overlapping relation to these north and south pole surfaces.

In the optical component-driving device of this construction, a magnetic flux 19 is produced between the two pole surfaces 14a and 14b. When electric current is supplied to the focusing coil 18, an electromagnetic force is exerted on those two portions 18a and 18b of the focusing coil 18 facing the two pole surfaces 14a and 14b, respectively, and an objective lens 11 and an holder member 12 are driven to thereby effect a focusing servo.

Figure 4:
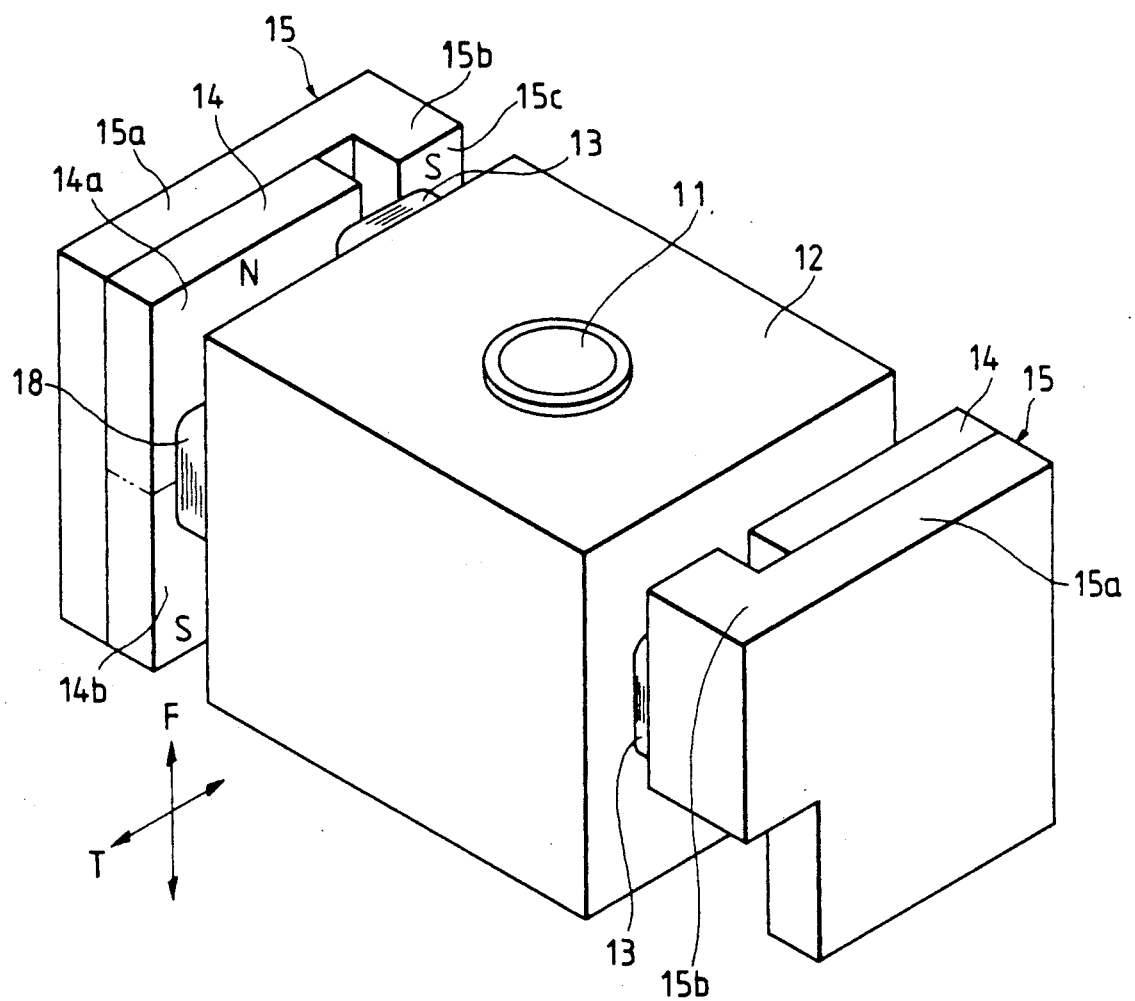
FIG. 4 is a perspective view of a modified form of the embodiment of FIG. 3.

FIG. 4 shows a modified form of the embodiment of FIG. 3. In this modified embodiment of the optical component-driving device the tracking coil 13, the magnet 14, the yoke 15 and the focusing coil 18, are duplicated on each of the opposite ends of the holder member 12. With this construction, a greater electromagnetic force can be produced as compared with the optical pickup shown in FIG. 3, and also the center of gravity of the driven component can be caused to coincide with the center of the driving force. This construction can be applied to the optical component-driving devices of FIGS. 1 and 2 also.

As described above, the optical component-driving devices according to the present invention comprise a magnetic circuit providing first and second pole surfaces of opposite polarity disposed adjacent to each other, and a coil or coils disposed in spaced, opposed relation to the first and second pole surfaces. The magnetic circuit comprises a magnet, one pole of which defines the first pole surface, and a yoke having one end portion held against the other pole of the magnet, the other end portion of the yoke defining the second pole surface.

Thus, since one of the planar pole surfaces of opposite polarity is constituted by the yoke, the magnet, which is expensive, can be considerably reduced in size as compared with the conventional optical component-driving device in which the two pole surfaces are provided only by a magnet. This reduces the cost. In addition, it will suffice that the magnet has a single pole, the magnetization can be effected satisfactorily, and therefore the device can be easily formed into a compact construction.

What is claimed is:

1. An optical component-driving device for driving an optical component of an optical pickup in which a spot of light is applied onto a recording surface of an optical recording medium, comprising a magnetic circuit having first and second pole surfaces of opposite polarity disposed adjacent to each other; and a coil disposed in spaced, opposed relation to said first and second pole surfaces; said magnetic circuit comprising a magnet, one pole of which defines said first pole surface, and a yoke having one end portion held against the other pole of said magnet, and the other end portion of said yoke defining said second pole surface.

2. An optical component-driving device as claimed in claim 1 wherein said magnet, yoke and coil are duplicated on two opposing sides of said optical component.

3. An optical component-driving device for an optical pickup according to claim 1, in which said first and second pole surfaces lie in a common plane.

4. An optical component-driving device as claimed in claim 3 wherein said magnet, yoke and coil are duplicated on two opposing sides of said optical component.

5. An optical component-driving device as claimed in claim 3 wherein said yoke is shaped to provide a first surface positioned adjacent said magnet along a tracking axis, and wherein said coil is positioned to electromagnetically straddle said first pole surface and the first surface of said yoke; said first surface constituting said second pole surface opposite in polarity to said first pole surface.

6. An optical component-driving device as claimed in claim 5 wherein said yoke is shaped to also provide a second surface positioned adjacent said magnet along an optical axis, and further comprising a second coil disposed in spaced opposed relation to, and straddling said first pole surface and said second surface; said second surface constituting a second pole surface opposite in polarity to said first pole surface.

7. An optical component-driving device as claimed in claim 6 wherein said magnet, yoke and said first and second coils are duplicated on two opposing sides of said optical component.

8. An optical component-driving device as claimed in claim 5 wherein a portion of the surface of said magnet is polarized opposite in polarity to said first surface; said portion being aligned on an optical axis relatively to the surface portion having the same polarity as said first surface; and a second coil is disposed in spaced opposed relation to and straddling the two pole surfaces of opposite polarity.

9. An optical component-driving device as claimed in claim 8 wherein said magnet, yoke and said first and second coils are duplicated on two opposing sides of said optical component.

10. An optical component-driving device as claimed in claim 5 wherein said magnet, yoke and coil are duplicated on two opposing sides of said optical component.

* * * * *